(12) United States Patent
Qi et al.

(10) Patent No.: US 12,444,158 B2
(45) Date of Patent: Oct. 14, 2025

(54) IMAGE SEMANTIC SEGMENTATION ALGORITHM AND SYSTEM BASED ON MULTI-CHANNEL DEEP WEIGHTED AGGREGATION

(71) Applicant: INNER MONGOLIA UNIVERSITY OF TECHNOLOGY, Hohhot (CN)

(72) Inventors: Yongsheng Qi, Hohhot (CN); Peiliang Chen, Hohhot (CN); Liqiang Liu, Hohhot (CN); Yongting Li, Hohhot (CN); Jianqiang Su, Hohhot (CN)

(73) Assignee: INNER MONGOLIA UNIVERSITY OF TECHNOLOGY, Hohhot (CN)

( * ) Notice: Subject to any disclaimer, the term of this patent is extended or adjusted under 35 U.S.C. 154(b) by 384 days.

(21) Appl. No.: 18/163,918

(22) Filed: Feb. 3, 2023

(65) Prior Publication Data
US 2023/0316699 A1   Oct. 5, 2023

(30) Foreign Application Priority Data
Feb. 10, 2022   (CN) .......................... 202210123937.2

(51) Int. Cl.
| | |
|---|---|
| G06V 10/26 | (2022.01) |
| G06V 10/40 | (2022.01) |
| G06V 10/776 | (2022.01) |
| G06V 10/80 | (2022.01) |
| G06V 10/82 | (2022.01) |

(52) U.S. Cl.
CPC .............. *G06V 10/26* (2022.01); *G06V 10/40* (2022.01); *G06V 10/776* (2022.01); *G06V 10/806* (2022.01); *G06V 10/82* (2022.01)

(58) Field of Classification Search
CPC ...... G06V 10/26; G06V 10/40; G06V 10/776; G06V 10/806; G06V 10/82; G06V 20/70; G06N 3/048; G06N 3/08; G06N 3/045
See application file for complete search history.

(56) References Cited

FOREIGN PATENT DOCUMENTS

| CN | 111127470 A | * | 5/2020 | .............. G06T 7/10 |
| CN | 112163449 A | * | 1/2021 | ............. G06N 3/045 |

OTHER PUBLICATIONS

Cai et al, Real-Time Semantic Segmentation of Remote Sensing Images Based on Bilateral Attention Refined Network, 2021, IEEE Digital Object Identifier, 9(2021): 28349-28360. (Year: 2021).*

(Continued)

*Primary Examiner* — Kathleen M Broughton
(74) *Attorney, Agent, or Firm* — PORUS IP LLC

(57) ABSTRACT

An image semantic segmentation algorithm and system based on multi-channel deep weighted aggregation where the image semantic segmentation algorithm is based on multi-channel deep weighted aggregation. The aggregation includes semantic features with definite class information in an image, transition semantic features between low-level semantic and high-level semantic, and semantic features of context logic relationship in an image are extracted by a low-level semantic channel, an auxiliary semantic channel and a high-level semantic channel, respectively. The aggregation further includes three different semantic features obtained in S1 are fused by weighted aggregation to obtain global semantic information of the image; S3, the semantic features output from respective semantic channels in S1 and the global semantic information in S2 are used to compute loss function for training.

7 Claims, 11 Drawing Sheets

(56) References Cited

OTHER PUBLICATIONS

Ding et al, LANet: Local Attention Embedding to Improve the Semantic Segmentation of Remote Sensing Images, 2021, IEEE Transactions on Geoscience and Remote Sensing, 59(1) 426-435. (Year: 2021).*

He et al, MGSeg: Multiple Granularity-Based Real-Time Semantic Segmentation Network, 2021, IEEE Transactions on Image Processing, 30(2021): 7200-7214. (Year: 2021).*

Wei et al, Multi-module Spatial Semantic Network for Semantic Segmentation, 2020, 9th International Conference on Informatics Electronics and Vision and 4th International Conference on Imaging, Vision and Pattern Recognition, pp. 1-9. (Year: 2020).*

Li et al, Multitask Semantic Boundary Awareness Network for Remote Sensing Image Segmentation, 2021, IEEE Transactions on Geoscience and Remote Sensing, 60 (2022), pp. 1-15. (Year: 2022).*

* cited by examiner

IMAGE SEMANTIC SEGMENTATION ALGORITHM AND SYSTEM BASED ON MULTI-CHANNEL DEEP WEIGHTED AGGREGATION

FIELD

The present disclosure relates to image semantic segmentation, in particular to a computer-implemented method for performing image semantic segmentation in complex real-world environments and system based on multi-channel deep weighted aggregation.

BACKGROUND

In recent years, with the development of deep learning technology, image semantic segmentation technology has been developed to a new stage. Various semantic segmentation algorithms have emerged. Image semantic segmentation algorithm is an important intelligent perception technology, its task is to assign semantic labels to each pixel, separate pixel regions of different objects in the image, and annotate the classes of each region. Traditional semantic segmentation algorithms have many disadvantages, such as slow reasoning speed, low precision of semantic segmentation, unable to run on intelligent mobile robots in real time and so on.

For most semantic segmentation algorithms, how to maintain the balance between speed and precision is still a key issue. In traditional semantic segmentation algorithms, some methods reduce the computational complexity of the network by limiting the size of the image, or by pruning the redundant channels of the network, so as to improve the speed of the algorithm reasoning. However, the segmentation accuracy of these semantic segmentation algorithms is low. There are also some methods that use U-shaped structure to operate on high resolution feature map to improve the segmentation accuracy, but this will greatly increase the computational complexity, so that the speed of algorithm reasoning is too slow. Obviously, the traditional semantic segmentation algorithms can not balance the relationship between precision and speed.

Considering that most of the current semantic segmentation algorithms have limited learning ability, resulting in the overall performance of the algorithm cannot be greatly improved, some researchers have proposed the idea of improving the learning ability of the semantic segmentation algorithm. The neural evolution method is the most significant, such as the typical models such as ConvGP (Convolutional Genetic Programming), EGAN (Evolutionary Generative Adversarial Networks), (Evolutionary AutoEncoder), CoDeepNEAT (Convolution Deep Neuro Evolution of Augmenting Topologies), WANN (Weight Agnostic Neural Network). These models can greatly improve the learning ability of the algorithm, but the reasoning speed is still limited, which can not solve the balance between the speed and the precision of the algorithm.

Some researchers have also proposed some improvements: for example, the BiSeNet semantic segmentation algorithm uses a two-branch structure combined with spatial information to improve the segmentation accuracy of the algorithm as much as possible while ensuring a certain speed, and has achieved a certain effect. However, the mutual independence between branches in the two-branch structure limits the learning ability of the algorithm, so that the algorithm cannot better learn the global semantic features of the image, which makes the improvement of segmentation accuracy very limited.

DFANet semantic segmentation algorithm uses multi-branch structure and information interaction between branches to extract image semantic features. Under the premise of ensuring the reasoning speed of the algorithm, the segmentation accuracy of the algorithm is improved to a certain extent. However, the multi-branch structure is the same, so only one kind of semantic information can be extracted, and the global semantic and context information features cannot be obtained better, which limits the segmentation accuracy of the algorithm.

To sum up, although there are many semantic segmentation algorithms based on deep learning, these algorithms can hardly guarantee the equalization between image segmentation accuracy and reasoning speed. Therefore, a brand-new semantic segmentation network framework is proposed to realize the equalization between segmentation accuracy and reasoning speed of image semantic segmentation algorithm.

SUMMARY

In view of the technical problems existing in the prior art, the object of the present disclosure is to provide an image semantic segmentation algorithm and system based on multi-channel deep weighted aggregation, which can solve the problem that the traditional image semantic segmentation algorithm cannot realize the tradeoff between segmentation accuracy and speed, and has stronger robustness.

An image semantic segmentation in complex real-world environments based on multi-channel deep weighted aggregation provided by the present disclosure comprises:

S1, semantic features with definite class information in an image, transition semantic features between low-level semantic and high-level semantic, and semantic features of context logic relationship in an image are extracted by a low-level semantic channel, an auxiliary semantic channel and a high-level semantic channel, respectively;

S2, three different semantic features obtained in S1 are fused by weighted aggregation to obtain global semantic information of the image.

S3, the semantic features output from respective semantic channels in S1 and the global semantic information in S2 are used to compute loss function for training.

Preferably, in S1: a shallow convolution structure network is used to construct the low-level semantic channel for extracting the low-level semantic information;

a depthwise separable convolution structure network is used to construct the auxiliary semantic channel, and transition semantic information obtained from the auxiliary semantic channel is fed back to the high-level semantic channel.

a deep convolution structure network is used to construct the high-level semantic channel for extracting the high-level semantic information.

Preferably, a process of extracting the low-level semantic information by the shallow convolution structure network includes:

$$LS(I_{H*W}) = S3(S2(S1(I_{H*W})))$$

wherein, LS(x) is a extraction process of the low-level semantic information, $I_{H*W}$ is input image array, S is a convolution stride.

Preferably, the separable convolution structure network includes three auxiliary modules connected in series and an attention mechanism module located at the end, each module transfers the extracted auxiliary semantic information of different levels to the high-level semantic channel;

a process of extracting the transition semantic information by the auxiliary semantic channel includes:

$$AS(K_{m*n}) = \text{Atten}(Aux(Aux(Aux(K_{m*n}))))$$

wherein, AS(x) is the extraction process of the transition semantic information, Km*n is a feature array input to the auxiliary semantic channel, Aux (x) is the auxiliary module, and Atten (x) is the attention mechanism module;

the auxiliary semantic information output at each stage of the auxiliary semantic channel includes:

$$Aux_1(K_{m*n}) = Aux(K_{m*n})$$

$$Aux_2(K_{m*n}) = Aux(Aux(K_{m*n}))$$

$$Aux_3(K_{m*n}) = Aux(Aux_2(K_{m*n}))$$

$$Aux_1'(K_{m*n}) = Up(AS(K_{m*n}), 4)$$

where Up(x,k) is upsampling of the attention mechanism module to the high-level semantic channel, x is the input, k is the upsampling multiple, and its selected value is 4.

Preferably, the high-level semantic channel includes a start module, a feature aggregation module, and a semantic embedding module, and a process of extracting the high-level semantic information includes:

it fuses with the auxiliary semantic information provided by the auxiliary semantic channel by the start module and the feature aggregation module to extract deep semantic information of the image, and then the semantic embedding module integrates the auxiliary semantic channel with the deep semantic information of the high-level semantic channel so as to obtain the high-level semantic information.

Preferably, the start module comprises two different down-sampling methods, convolution and maximum pooling, and two output results are connected and output after convolution; the feature aggregation module comprises two feature aggregation sub-modules, deep convolution is used to deepen the number of feature layers, the aggregation process of the feature aggregation module comprises:

$$FGB(K'_{m*n}, s_1, s_1') = FG(FG(K'_{m*n}, s_1), s_1')$$

wherein, FGB(x) is reasoning process of the feature aggregation module, FG(x,s$_1$) is reasoning process of the feature aggregation sub-module, $$K'_{m*n}$$

is input feature array, stride s$_1$=2, $$s_{1=1}';$$

the reasoning processes of the feature aggregation modules of the three auxiliary modules in the auxiliary semantic channel includes:

$$FGB1(K_{m*n}) = FGB(ST(K_{m*n}) + Aux_1(K_{m*n}) + Aux_1'(K_{m*n}), s_1, s_1')$$

$$FGB2(K_{m*n}) = FGB(FGB1(K_{m*n}) + Aux_2(K_{m*n}), s_1, s_1')$$

$$FGB3(K_{m*n}) = FGB(FGB2(K_{m*n}) + Aux_3(K_{m*n}), s_1, s_1')$$

the semantic embedding module uses global average pooling and jump connection structure to deeply fuse the high-level semantic channel and the auxiliary semantic information provided by the auxiliary semantic channel;

the semantic information extraction process of the high-level semantic channel includes:

$$AS(K_{m*n}) = SEB(FGB3(K_{m*n}))$$

wherein, AS(x) is the semantic information extraction process of the high-level semantic channel, SEB(x) is the reasoning process of the semantic embedding module.

Preferably, wherein, the fusion of semantic features in S2 includes weighted aggregation and fusion of three semantic features, the weighted aggregation includes: updating the low-level semantic channel, the auxiliary semantic channel, and the high-level semantic channel to obtain weighted weights of the semantic features $\varepsilon_1$, $\varepsilon_2$ and $\varepsilon_3$, respectively, and the updating of the weight is determined adaptively by the MIoU={MIoU$_1$, MIoU$_2$, MIoU$_3$} measured by the three semantic features in a verification set, the MIoU is obtained on the verification set by using the network weights of the respective channels, and then the weighted weights of the three semantic features are updated by the MIoU values according to the following formulas:

$$\varepsilon_1 = \begin{cases} 1 + MIoU, & MIoU_1 = \max\{MIoU\} \\ 1, & \min\{MIoU\} < MIoU_1 < \max\{MIoU\} \\ 1 - MIoU, & MIoU_1 = \min\{MIoU\} \end{cases}$$

$$\varepsilon_2 = \begin{cases} 1 + MIoU, & MIoU_2 = \min\{MIoU\} \\ 1, & \min\{MIoU\} < MIoU_2 < \max\{MIoU\} \\ 1 - MIoU, & MIoU_2 = \min\{MIoU\} \end{cases}$$

$$\varepsilon_3 = \begin{cases} 1 + MIoU, & MIoU_3 = \min\{MIoU\} \\ 1, & \min\{MIoU\} < MIoU_3 < \max\{MIoU\} \\ 1 - MIoU, & MIoU_3 = \min\{MIoU\} \end{cases}$$

weighting processes of three semantic features include:

$$\begin{cases} \phi_1(x) = \varepsilon_1^* Conv(x) \\ \phi_2(x) = \varepsilon_2^* sigmoid(x) \\ \phi_3(x) = \varepsilon_3^* Up(x) \end{cases}$$

wherein, Up is an upsampling with a magnification of 2, Up(x) represents the upsampling, Conv is convolution operation, the calculation of sigmoid (x) includes:

$$sigmoid = \frac{1}{1 + e^{-x}}.$$

Preferably, the fusion of the three semantic features includes multiplying the weighted results obtained by the pairwise semantic channels and then performing 3*3 convolution with a stride of 1, the pairwise aggregation processes of three semantic features comprise:

$$\begin{cases} SA_1(x) = Conv_1(\phi_1(x) * \phi_3(x)) \\ SA_2(x) = Conv_1(\phi_1(x) * \phi_2(x)) \\ SA_3(x) = Conv_1(\phi_2(x) * \phi_3(x)) \end{cases}$$

wherein, SA1(x), SA2 (x) and SA3(x) are the pairwise aggregation processes of three semantic features;

a composite process of the three semantic features obtained from the three semantic channels comprises:

$$MSA(x)=SA_1(x)+SA_2(x)+SA_3(x)$$

wherein, MSA (x) is the composite process of the three semantic features.

Preferably, in S3, the semantic features output from respective channels are upsampled, the upsampled results and the global semantic information of the image are used together to calculate loss for random gradient descent learning, the loss function includes calculation of weight, calculation of the loss function, and determination of the loss function in a comprehensive training mechanism, wherein the calculation of the weight includes:

$$\alpha = \frac{(n+1)-2}{(n+1)+2} = \frac{n-1}{n+3}$$

wherein, α is the weight, n is the number of classes; calculation of the loss function comprises:

$$CED(x,y)=CEL(x,y)+\alpha*DL(x,y)$$

wherein, x is prediction data, y is real data, CEL(x, y) is Cross-Entropy loss function and DL (x, y) is Dice Loss loss function;

the determination of loss function in comprehensive training mechanism includes:

$$\text{Loss}(P_{re}, A_1, A_2, A_3, T) = CED(P_{re}, T) + \sum_{i=1}^{3} CED(A_i, T)$$

wherein, T is a real label, Pre is output label of the the global semantic information, and $A_1$, $A_2$ and $A_3$ are the output labels of the low-level semantic channel, the auxiliary semantic channel and the high-level semantic channel, respectively.

The present disclosure further provide an image semantic segmentation system which uses the above image semantic segmentation algorithm based on multi-channel deep weighted aggregation, comprising: a three-channel semantic representation model, an three-semantic weighted aggregation module and an enhanced training module; the three-channel semantic representation model includes a low-level semantic channel, an auxiliary semantic channel, and a high-level semantic channel; the auxiliary semantic channel includes an auxiliary module and an attention mechanism module, and the high-level semantic channel includes a start module, α feature aggregation module, and a semantic embedding module.

The present disclosure provides a new high-precision real-time image semantic segmentation algorithm based on Muti-Channel Deep Weighted Aggregation Net, MCDWA Net, abbreviated as MCDWA Net.

Firstly, the multi-channel idea is introduced by a three-channel semantic representation model, which mainly includes three different semantic channels: low-level semantic channel, auxiliary semantic channel and high-level semantic channel. Three semantic channels are used to extract three classes of complementary semantic information. The low-level semantic channel outputs semantic features with explicit class information in the image. The auxiliary semantic channel extracts the transition information between low-level semantic and high-level semantic, and multi-level feedbacks to the high-level semantic channel to ensure the rapidity and accuracy of extraction of the high-level semantic channel. The high-level semantic channel obtains the semantic features of the context logic relationship in the image.

Secondly, with a three semantic features weighted aggregation module, the complementary semantic features output from the three channels can be weighted and then deeply fused to output global semantic features, thus the segmentation accuracy of the network is greatly improved.

Finally, the enhanced training module combines two loss functions to improve the defects of them, so as to enhance the feature representation during training, enhance and improve the training speed.

Compared with the traditional semantic segmentation algorithm, the image semantic segmentation algorithm in the present disclosure has higher segmentation precision, faster reasoning speed, stronger adaptability to various complex environments and better practical value.

DESCRIPTION OF DRAWINGS

Various other advantages and benefits will become apparent to those of ordinary skill in the art by reading the detailed description of the preferred embodiment below. The accompanying drawings are intended only for the purpose of illustrating preferred embodiments and are not intended to limit the disclosure. And throughout the drawings, like reference numerals denote like parts, in which.

DETAILED DESCRIPTION

Figure 1:
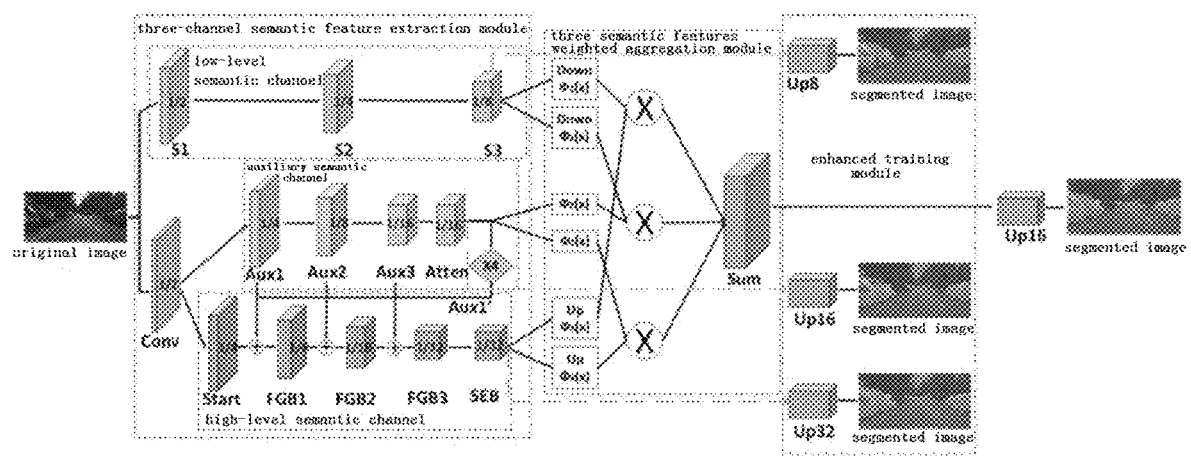
FIG. 1 is a logical framework diagram of an image semantic segmentation algorithm based on multi-channel deep weighted aggregation according to the present disclosure.

An exemplary embodiment will be described in detail herein, and an example thereof is shown in the drawings.

When the following description relates to the accompanying drawings, the same numerals in different drawings denote the same or similar elements unless otherwise indicated. The embodiments described in the following exemplary embodiments do not represent all embodiments consistent with the present disclosure. Instead, they are merely examples of devices and methods consistent with some aspects of the present disclosure as detailed in the appended claims.

The terms used in the present disclosure are for the purpose of describing particular embodiments only and are not intended to limit the disclosure. The singular forms of "a", "said", "the" used in the present disclosure and the appended claims are also intended to include most forms unless the context clearly indicates other meanings. It should also be understood that the term "and/or" as used herein refers to and includes any or all possible combinations of one or more associated listed items.

It should be understood that while various information may be described in the present disclosure using the terms of first, second, third, or the like, such information should not be limited to these terms. These terms are used only to distinguish information of the same type from each other. For example, without departing from the scope of the present disclosure, the first information may also be referred to as second information, and similarly, the second information may also be referred to as first information. Depending on the context, the word "if" as used here could be interpreted as "at a time of", "when." or "in response to determine.

Referring to FIG. 1, an image semantic segmentation algorithm based on multi-channel deep weighted aggregation provided by the present disclosure includes: 1) constructing a low-level semantic channel using a shallow convolution network structure for extracting semantic features having explicit class information in an image, 2) constructing a deeper auxiliary semantic channel using a depthwise separable convolution for extracting transition information between the low-level semantic and the high-level semantic, and implementing multi-layer feedback on the high-level semantic channel; and 3) constructing a high-level semantic channel using a deep convolution structure for obtaining semantic features of a context logical relationship in an image.

Then a three semantic features weighted aggregation module is designed, which can weigh the complementary semantic features output from the three channels, then perform deep fusion and output the global semantic features, thus greatly improving the segmentation accuracy of the network.

Finally, an enhanced training mechanism is introduced to enhance the feature representation during the training and to enhance and improve the training speed.

Compared with the traditional semantic segmentation algorithm, it has stronger robustness, and can realize the tradeoff between the speed and precision of image semantic segmentation.

The image semantic segmentation algorithm based on multi-channel deep weighted aggregation proposed by the present disclosure introduces multi-channel concept compared with the traditional semantic segmentation algorithm. A three-channel semantic representation model is designed to extract three different classes of semantic information in the image. The model can extract all classes of semantic information in the image to the greatest extent, and assign the semantic information extraction task to the three channels, greatly reducing the reasoning time of the algorithm and improving the operation speed of the algorithm. In order to enable the three classes of local semantic information to be better fused together, the present disclosure provides a three semantic features weighted aggregation module, which fuses the three classes of semantic information in pairs after being weighted, and fuses all the semantic information together finally, thereby fusing the three classes of local semantic information into global semantic information. In addition, in order to improve the training speed of the algorithm, the model of algorithm can be trained faster by an enhanced training module.

The present disclosure uses the following technical solutions and steps:

The three-channel semantic features are low-level semantic channel, auxiliary semantic channel and high-level semantic channel, respectively.

Figure 2:
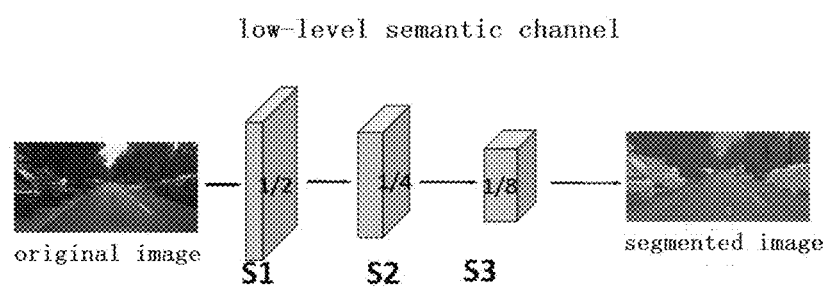
FIG. 2 is a schematic structural diagram of a low-level semantic channel network.

The low-level semantic channel is used to extract the semantic features with explicit type information in the image, which can only be completely displayed in the high-resolution feature map. Therefore, the present disclosure extracts the low-level semantic information by the shallow structure convolution network, as shown in FIG. 2. This simple shallow structure convolution network can not only extract high resolution feature maps, but also greatly reduce the reasoning time.

Set the input image array to IH*W and the number of channels to 3, the extraction of the low-level semantic information can be expressed as the process of S1-S3 in Table 1.

In Table 1, H and W are the height and width of the input image, respectively, Conv is the convolution operation, k is the convolution kernel size, Cout is the number of channels for output image, and s is the convolution stride.

TABLE 1

Extraction Process of Semantic Information of Low-Level Semantic Channel

| | | Extraction of Low-Level Semantic Information | | | | |
| --- | --- | --- | --- | --- | --- | --- |
| process | Size of input | operation | k | $C_{out}$ | s | Size of output |
| S1 | H*W | Conv | 3 | 16 | 2 | H/2*W/2 |
|  | H/2*W/2 | Conv | 3 | 16 | 1 | H/2*W/2 |
| S2 | H/2*W/2 | Conv | 3 | 32 | 2 | H/4*W/4 |
|  | H/4*W/4 | Conv | 3 | 32 | 1 | H/4*W/4 |
| S3 | H/4*W/4 | Conv | 3 | 64 | 2 | H/8*W/8 |
|  | H/8*W/8 | Conv | 3 | 64 | 1 | H/8*W/8 |

Set the function LS(x) to an information extraction process for a low-level semantic channel, extraction process of the low-level semantic information is shown in the following formula (1):

$$LS(I_{H*W})=S3(S2(S1(I_{H*W}))) \qquad (1)$$

It can be seen from Table 1 that the low-level semantic channel will eventually output the low-level semantic features LS (IH*w) of H/8*W/8*64, which can better represent the semantic features with explicit class information in the image.

The auxiliary semantic channel is used to extract the transition semantic information between the low-level semantic and the high-level semantic in the image, and provide it to the high-level semantic channel. The auxiliary semantic channel assists the high-level semantic channel to extract the context information in the image to play an auxiliary role.

The present disclosure uses depthwise separable convolution (DSC), designs an auxiliary module (Aux) which can not only improve the operation speed, but also can extract deeper feature information. It connects the three auxiliary modules in series, and adds an attention mechanism module (Atten) of full connection structure at the end, so as to retain the largest receptive field and output more complete auxiliary feature information. Finally, the auxiliary semantic features extracted from each stage are transferred to the high-level semantic module to construct the auxiliary channel. The network structure is shown in FIG. 3.

Figure 3:
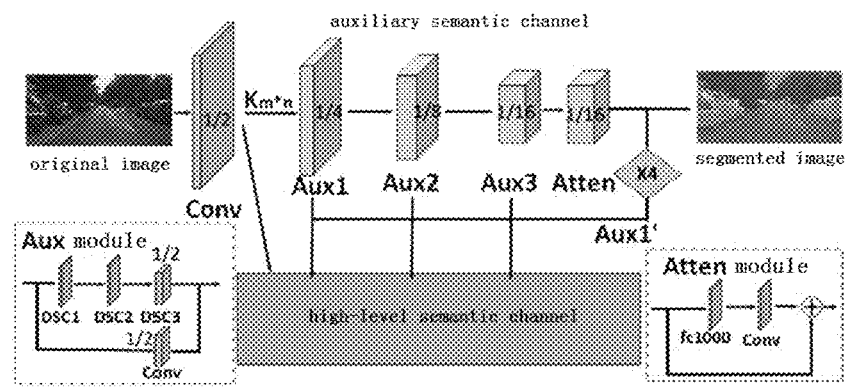
FIG. 3 is a schematic structural diagram of an auxiliary semantic channel network.

As shown in FIG. 3, in Aux module, the result of the three-layer depthwise separable convolution (DSC) and the result of the one-layer 3*3 convolution with stride of 2 are output after combination. The Atten module first changes the input to an array structure of n*1000*1*1 (n is the number of classes), and then performs 1*1 convolution with stride of 1 on the input, and finally returns to the original input shape, and merges with the input to output.

Set the feature array input to the auxiliary semantic channel is $K_{m*n}$, the Aux module is represented by Aux (x), the Atten module is represented by Atten (x), and the AS (x) represents the information extraction process of auxiliary semantic channel, the information extraction process of auxiliary semantic channel may be represented as follows:

$$AS(K_{m*n}) = Atten(Aux(Aux(Aux(K_{m*n})))) \quad (2)$$

Further, it can be seen from FIG. 3 that the auxiliary semantic channel finally outputs the transition semantic features $AS(K_{m*n})$ of H/16*W/16*64.

Based on the above analysis, set the upsampling operation to Up(x,k) (where x is the input, k is the upsampling multiple, here k=4), the auxiliary semantic information output at each stage of the auxiliary semantic channel can be expressed as:

$$Aux_1(K_{m*n}) = Aux(K_{m*n}) \quad (3)$$

$$Aux_2(K_{m*n}) = Aux(Aux_1(K_{m*n})) \quad (4)$$

$$Aux_3(K_{m*n}) = Aux(Aux_2(K_{m*n})) \quad (5)$$

$$Aux_1'(K_{m*n}) = Up(AS(K_{m*n}),4) \quad (6)$$

It can be seen that the auxiliary semantic channel feeds back the different levels of auxiliary semantic information from each stage to the high-level semantic channel, which makes the high-level semantic channel more accurate in extracting the context logic relationship in the image, speeding up the extraction speed and accuracy.

The high-level semantic channel is used to obtain the semantic features of the context logic relationship in the image. The high-level semantic channel fuses with the auxiliary semantic information provided by the auxiliary semantic channel by the start module (Start) and the feature aggregation module (CGB) to extract the deep semantic information of the image.

Figure 4:
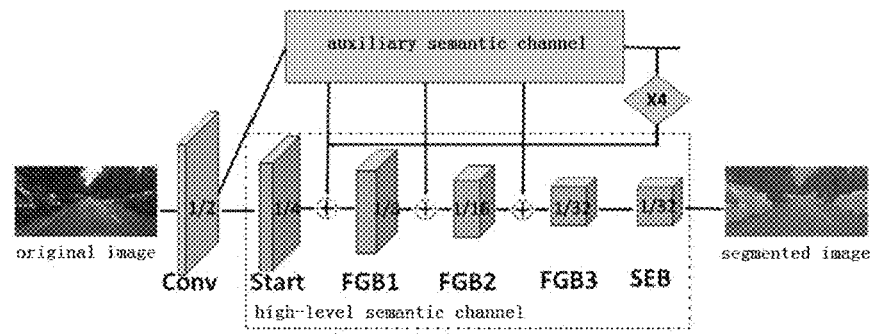
FIG. 4 is a schematic structural diagram of a high-level semantic channel network.

Finally, the semantic embedding module integrates the auxiliary semantic channel with the deep semantic information of the high-level semantic channel to complete the information extraction process of the high-level semantic channel. A schematic diagram of the network structure is shown in FIG. 4.

Figure 5:
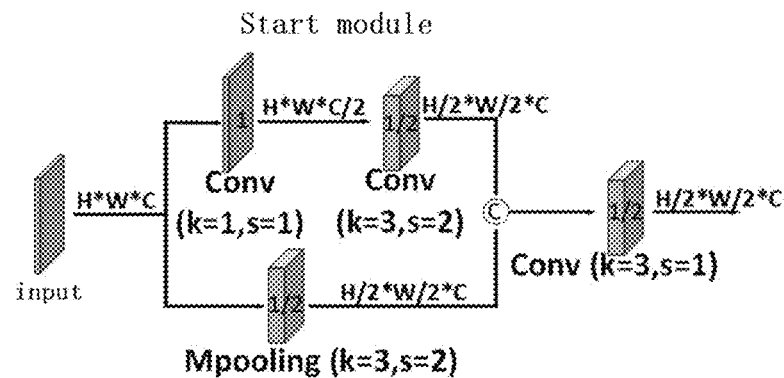
FIG. 5 is a schematic structural diagram of a start module network.

Start module (Start): In the high-level semantic channel, the start module is used as the first stage. As shown in FIG. 5, it uses two different down-sampling methods, convolution and maximum pooling. Their output results are connected and output after convolution to enhance the feature representation ability. ST (x) is the reasoning process of the start module.

Figure 6:
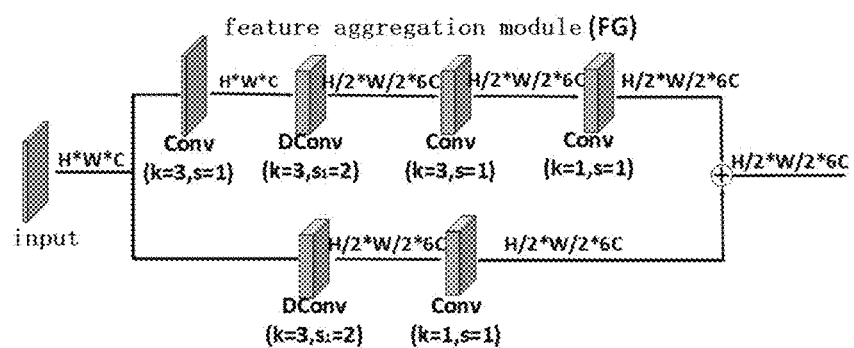
FIG. 6 is a schematic structural diagram of a feature aggregation sub-module network.

Feature aggregation module (FGB): the feature aggregation module is provided after the start module. The feature aggregation module consists of two feature aggregation sub-modules. The schematic diagram of the feature aggregation sub-module network structure is shown in FIG. 6. Deep convolution is used to deepen the number of feature layers, so as to extract deeper semantic information, aggregate semantic features more effectively, and output deeper features.

Assuming that FG(x,s1) represents the reasoning process of the feature aggregation sub-module, and FGB(x) represents the reasoning process of the feature aggregation module, the aggregation process is shown in formula (7):

$$FGB(K'_{m*n}, s_1, s'_1) = FG(FG(K'_{m*n}, s_1), s'_1) \quad (7)$$

where, $$K'_{m*n}$$

is input feature array, stride $s_1=2$, $$s'_1 = 1.$$

Further combining formulas (3), (4), (5), (6) and (7), the reasoning processes of FGB1, FGB2 and FGB3 can be expressed as follows.

$$FGB1(K_{m*n}) = FGB(ST(K_{m*n}) + Aux_1(K_{m*n}) + Aux'_1(K_{m*n}), s_1, s'_1) \quad (8)$$

$$FGB2(K_{m*n}) = FGB(FGB1(K_{m*n}) + Aux_2(K_{m*n}), s_1, s'_1) \quad (9)$$

$$FGB3(K_{m*n}) = FGB(FGB2(K_{m*n}) + Aux_3(K_{m*n}), s_1, s'_1) \quad (10)$$

Figure 7:
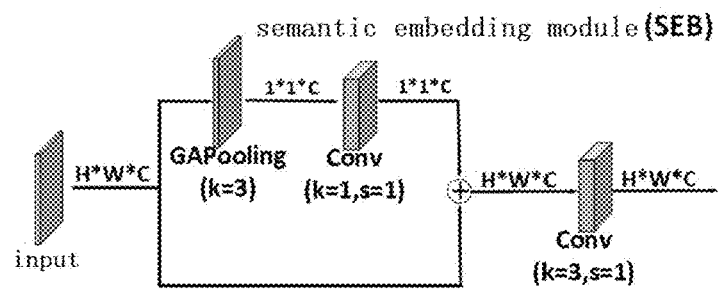
FIG. 7 is a schematic structural diagram of a semantic embedding module network.

Semantic embedding module (SEB): In the final stage of the high-level semantic channel, it is a semantic embedding module, which uses the global average pooling and jump connection structure to deeply fuse the high-level semantic channel and the auxiliary semantic information provided by the auxiliary semantic channel, so as to more effectively embed the global context information, as shown in FIG. 7. SEB(x) represents the reasoning process of the module, and AS (x) represents the semantic information extraction process of the high-level semantic channel. The reasoning process of AS (x) can be expressed as follows by combining formula (10).

$$AS(K_{m*n}) = SEB(FGB3(K_{m*n})) \quad (11)$$

In conclusion, the high-level semantic features $AS(K_{m*n})$ of H/32*W/32*128 can be extracted by the high-level semantic channel.

The above three classes of semantic information are local semantic features of the image, which are complementary. Therefore, the three classes of semantic information need to be fused to obtain global semantic information of the image. Three classes of semantic information are fused by using feature weighted aggregation method.

Figure 8:
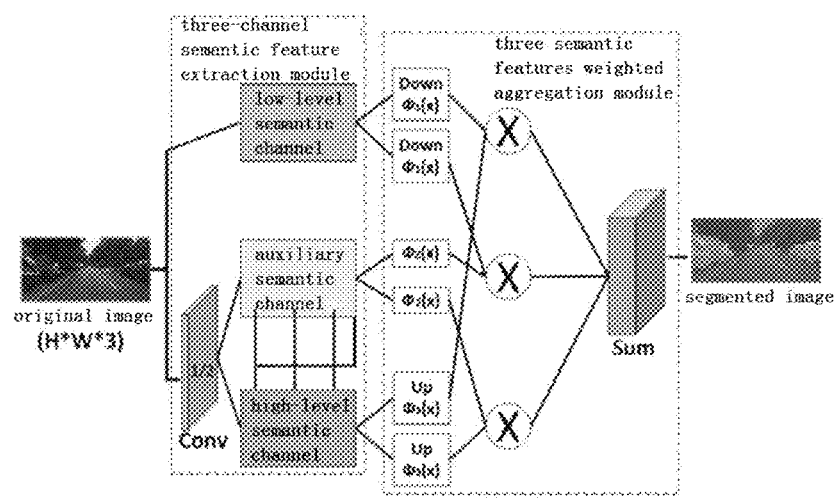
FIG. 8 is a schematic diagram of three semantic features weighted aggregation module.

The specific principle of fusion is shown in FIG. 8. When an image of H*W*3 is input, semantic features are first extracted by three semantic channels, and then weighted aggregation is performed as follows:

Analysis of principle of weighted aggregation

The weighted weights of the three semantic features are $\varepsilon_1$, $\varepsilon_2$ and $\varepsilon_3$, respectively, and their initial values are all set to 1. The changes of the weights in operation are determined adaptively by the MIoU={MIoU$_1$, MIoU$_2$, MIoU$_3$} measured by the three semantic features in a verification set. The specific updating rule is to calculate MIoU on the verification set by using the network weights of the current respective channels, and then update $\varepsilon_1$, $\varepsilon_2$ and $\varepsilon_3$ by the MIoU value according to the following formulas (14)~(16).

$$\varepsilon_1 = \begin{cases} 1 + MIoU, & IoU_1 = \max\{MIoU\} \\ 1, & \text{in } \{MIoU\} < MIoU_1 < \max\{MIoU\} \\ 1 - MIoU, & IoU_1 = \min\{MIoU\} \end{cases} \quad (12)$$

$$\varepsilon_2 = \begin{cases} 1 + MIoU, & IoU_2 = \max\{MIoU\} \\ 1, & \text{in } \{MIoU\} < MIoU_2 < \max\{MIoU\} \\ 1 - MIoU, & IoU_2 = \min\{MIoU\} \end{cases} \quad (13)$$

$$\varepsilon_3 = \begin{cases} 1 + MIoU, & IoU_3 = \max\{MIoU\} \\ 1, & \text{in } \{MIoU\} < MIoU_3 < \max\{MIoU\} \\ 1 - MIoU, & IoU_3 = \min\{MIoU\} \end{cases} \quad (14)$$

As shown in FIG. 8, Down is a 3*3 convolution with stride of 2, Up is an upsampling with a magnification of 2, and Up(x) represents the upsampling process, weighting processes of the three semantic feature are as follows:

$$\begin{cases} \phi_1(x) = \varepsilon_1 * Conv(x) \\ \phi_2(x) = \varepsilon_2 * sigmoid(x) \\ \phi_3(x) = \varepsilon_3 * \text{Up}(x) \end{cases} \quad (15)$$

wherein, $$sigmoid(x) = \frac{1}{1 + e^{-x}} \quad (16)$$

Aggregation of three semantic features

As shown in FIG. 8, ⊗ represents a 3*3 convolution with a stride of 1 after multiplying the two results. The convolution process is represented by Conv1(x), the pairwise aggregation processes of three semantic features are represented by SA1(x), SA2(x) and SA3(x), respectively, and the final composite process is represented by MSA (x). The followings could be obtained from formula (15):

$$\begin{cases} SA_1(x) = Conv_1(\phi_1(x) * \phi_3(x)) \\ SA_2(x) = Conv_1(\phi_1(x) * \phi_2(x)) \\ SA_3(x) = Conv_1(\phi_2(x) * \phi_3(x)) \end{cases} \quad (17)$$

The final composite process of the three semantic features can be expressed as follows:

$$MSA(x) = SA_1(x) + SA_2(x) + SA_3(x) \quad (18)$$

In summary, formula (15)~(18) completes the reasoning process of three semantic features weighted aggregation.

Figure 9:
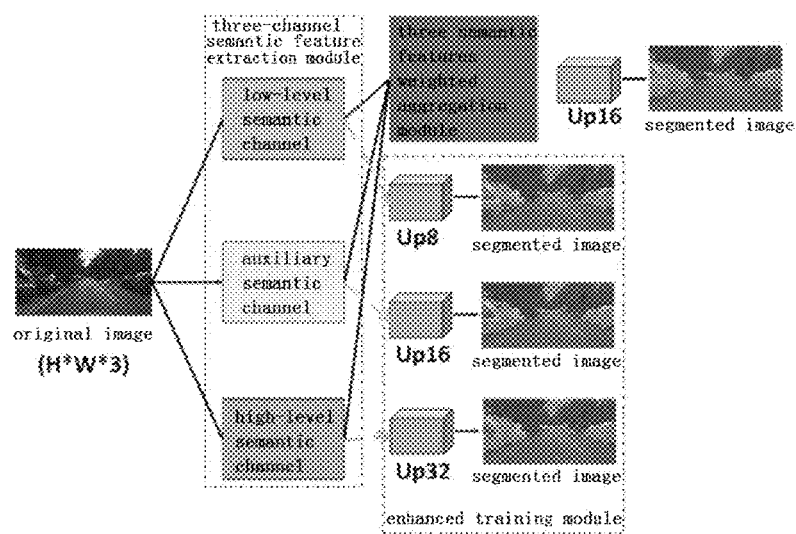
FIG. 9 is a schematic diagram of an enhanced training module.

In order to further improve the training speed and training effect, α new enhanced training module is designed, which can enhance feature representation during training. As shown in FIG. 9, when the MCDWA_Net network is trained, the features output from respective channels are upsampled, and the umsampled results and final output results of the network are used together to calculate the loss for random gradient descent learning.

In traditional semantic segmentation, Cross-Entropy loss function is generally used for gradient descent learning, as shown in formula (19).

$$CEL(q, p) = -\sum_{i=1}^{c} p_i \log(q_i) \quad (19)$$

Where p is real data, q is prediction data, and C is the number of classes.

However, when the Cross-Entropy loss function is used during semantic segmentation, the update of the weight is affected by the error. For example, if the number of the foreground pixel in the image is much less than the number of the background pixel, P; =0 in formula (19) will dominate, and the trained model will be biased to the background.

With regard to this, another Dice Loss loss function is introduced as shown in formula (20).

$$DL(X, Y) = 1 - \frac{2|X \cap Y|}{|X| + |Y|} \quad (20)$$

In formula (20), X is prediction data, and Y is real data. In general, the use of Dice Loss loss function will be disadvantageous to the back propagation, making the training process unstable, so this loss function is not widely used.

However, it is found from experiments that the Dice Loss loss function has a characteristic that when the number of foreground pixels in the image is not equal to the number of background pixels, the function can just compensate the defect of the Cross-Entropy loss function and eliminate the influence of deviation. Therefore, the present disclosure combines the two functions, and designs a joint loss function based on Cross-Entropy and Dice Loss, abbreviated as CEDice loss function.

Assuming that x is the prediction data, y is the real data, n is the number of classes, and α is the weight, the formula is as follows:

$$\alpha = \frac{(n+1)-2}{(n+1)+2} = \frac{n-1}{n+3} \quad (21)$$

The CEDice loss function can be expressed as follows:

$$CED(x,y) = CEL(x,y) + \alpha * DL(x,y) \quad (22)$$

CEL(x, y) is Cross-Entropy (cross entropy loss function), DL (x, y) is Dice Loss (hinge loss function). It can be seen from formulas (21) and (22) that when the number of segmenting classes in semantic segmentation is 1, it is equivalent to a binary classification, and in this case, Dice Loss loss function is not required. Therefore, only Cross-Entropy loss function works. When the number of classes in semantic segmentation is larger, the number of foreground pixels in the image is much less than that of the background pixels, that is, the number of foreground pixels in the image is not equal to the number of the background pixels. In this case, when the weight of Dice Loss loss function is larger, the influence of pixel imbalance is greatly reduced.

In summary, if the loss function in the comprehensive training mechanism in the present disclosure is replaced with the CEDice loss function, the final loss function may be set to:

$$\text{Loss}(P_{re}, A_1, A_2, A_3, T) = CED(P_{re}, T) + \sum_{i=1}^{3} CED(A_i, T) \quad (23)$$

In formula (23), T is a real label, Pre is an output label of the MCDWA_Net network, and A1, A2 and A3 are the output labels of the low-level semantic channel, the auxiliary semantic channel and the high-level semantic channel, respectively.

The following describes the technical solutions of the present disclosure for different application environments. The hardware environment of the simulation experiment platform in the present disclosure is Intel Core i7-10750 CPU, @2.6 GHZ, x6 cores and 16 GB RAM, and the operation environment of the experiment is Pytorch 1.6.0.

EXAMPLE 1

In this example, an experiment of Cityscapes streetscape dataset is mainly performed.

In the simulation experiment, the Cityscapes streetscape dataset is used to verify. The dataset has eighteen classes of streetscapes and one class of background (total number of classes is 19), and 3475 pictures in the dataset and their labels are used for training, verification and testing. The number of pictures in a training set, α verification set and a testing set are 2975, 300 and 200 respectively. Then, an actual scene dataset of the laboratory corridor was made. The dataset has seven corridor scene classes and one background class (total number of classes is 8), and has 350 pictures and their labels, 300 pictures for training model, 30 pictures for verifying model and 20 pictures for testing model. In order to fully demonstrate the effectiveness of the algorithm in the present disclosure, it is compared and analyzed with BiSeNet, BiSeNetV2, DFANet, Deeplab V3 and ShuffleNet V2 algorithms respectively.

1) Model Training

When training the MCDWA_Net model with the Cityscapes streetscape dataset, the training batch Batch size is set to 4, the number of classes Num_classes is set to 19, the number of iterations Epoches is set to 500, the learning strategy adopts the Random gradient descent (SGD) algorithm, and its momentum is set to 0.9, the initial learning rate is set to 0.05, and the weight decay rate is set to 0.0001.

Figure 10:
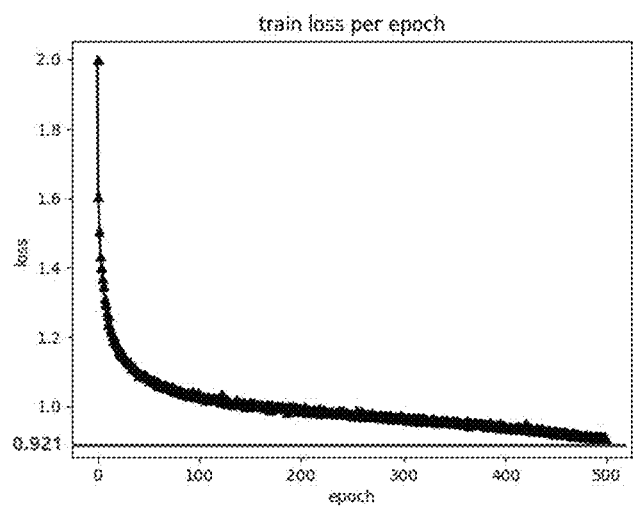
FIG. 10 is a graph showing the change in model train loss value in example 1.

When training the model, the enhanced training module of the present disclosure is used to apply the three semantic features extracted from respective channels to the formula (23) to calculate the loss function, and uses the random gradient descent algorithm for training and learning. Change in loss during training is shown in FIG. 10.

2) Model Performance Evaluation Index

First, Mean Intersection over Union (MIoU) is introduced to evaluate the accuracy of the model. MIoU evaluates the accuracy of the model in segmenting objects. The higher the MIoU value, the better the object segmentation effect. The calculation method is shown in formula (23):

$$MIoU = \frac{1}{k+1} \sum_{i=0}^{k} \frac{TT_i}{FT_i + FF_i + TT_i} \quad (24)$$

In the formula, k is the number of classes, FTi is the number of samples in the i-th class in which the prediction is wrong and the prediction is true, FFi is the number of samples in the i-th class in which the prediction is wrong and the prediction is false, and TTi is the number of samples in the i-th class in which the prediction is correct.

Figure 11:
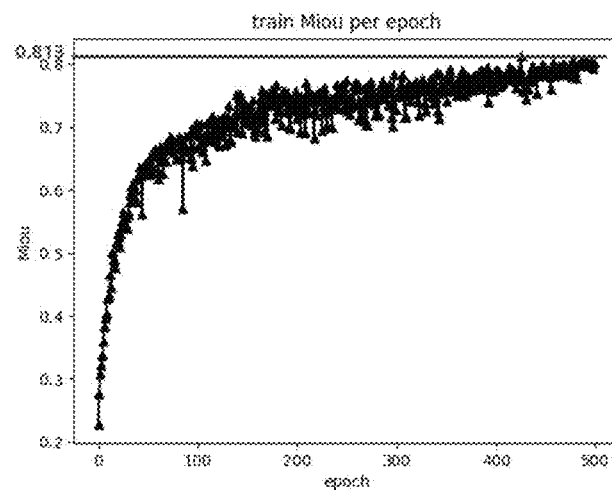
FIG. 11 is a graph showing the change in model train MIoU value in example 1.

The change in MIoU value during training the algorithm of the present invention with the Cityscapes streetscape dataset is shown in FIG. 11.

3) Ablation Experiment of Model

The ablation experiments were performed on the Cityscapes streetscape dataset to verify the effectiveness of each module in the network model, and the algorithm was evaluated using the Cityscapes streetscape dataset.

Figure 12:
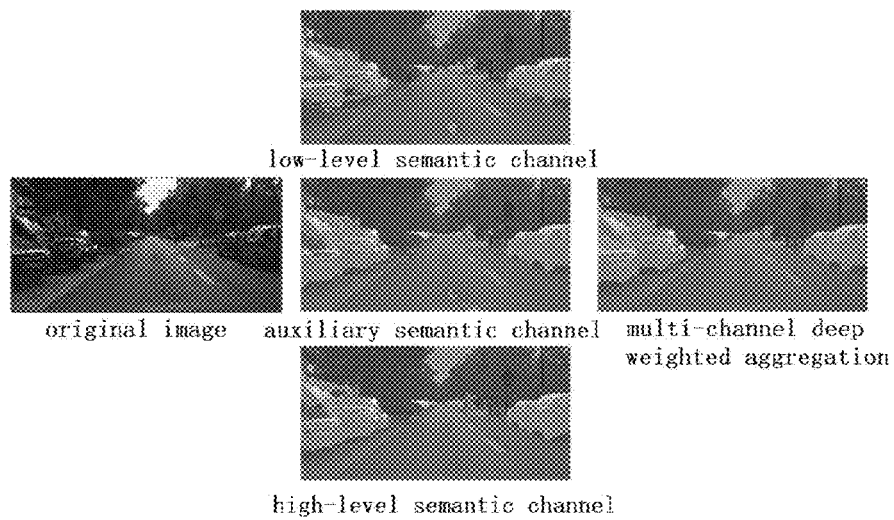
FIG. 12 is an effect diagram of an ablation experiment.

Table 2 and FIG. 12 show the experimental results of MCDWA_Net on the Cityscapes streetscape dataset. The first three lines in Table 2 represent the segmentation accuracy and computational complexity when only one channel is used. The low-level semantic channel cannot obtain the context logic relationship features of the image. The auxiliary semantic channel can only extract the transition semantic information. The high-level semantic channel contains the context logic relationship semantic features of the image, but there is no explicit class information. Therefore, all three semantic channels cannot obtain the complete semantic information of the image, and the three classes of semantic information must be fused to express the complete semantic information of the image. The fusion method also plays a crucial role. For example, the fusion effect of direct addition in the fourth line is obviously worse than the fusion effect of the semantic features weighted in the fifth line in Table 2. However, it can be seen that no matter which fusion method is used, the segmentation effect after fusion is obviously superior to that of each channel, which indicates that the semantic information extracted by the three channels are local and complementary.

In addition, the method of model training also affects segmentation effect of the model. The segmentation accuracy of the model trained by the conventional training method is 0.6% lower than the segmentation accuracy of the model trained by the enhanced training method of the present disclosure. Therefore, to some extent, the enhanced training method designed by the present disclosure can also improve the segmentation accuracy of the trained model. In conclusion, the weighted aggregation of three classes of complementary semantic information results in better image semantic segmentation, higher segmentation accuracy and more explicit expression of context information.

TABLE 2

Ablation Experiment of MCDWA_Net on Cityscapes streetscape dataset

| Type of channel | | | Fusion method | | Training strategy | | Performance index | |
| --- | --- | --- | --- | --- | --- | --- | --- | --- |
| low-level semantic channel | auxiliary semantic channel | high-level semantic channel | Addition aggregation | Three Semantic Features Weighted Aggregation | General training strategy | Enhanced training strategy | MIoU (%) | computational complexity (G) |
| √ | | | | | | | 62.8 | 15.26 |
| | √ | | | | | | 64.3 | 1.6 |
| | | √ | | | | | 66.2 | 8.25 |
| √ | √ | √ | √ | | | | 76.1 | 22.1 |
| √ | √ | √ | | √ | | | 78.2 | 22.4 |
| √ | √ | √ | | √ | √ | | 79.8 | 22.4 |
| √ | √ | | | √ | | √ | 80.4 | 22.4 |

4) Model Performance Comparison Experiment

The BiSeNet, BiSeNetV2, DFANet, Deeplab V3 and ShuffleNet V2 algorithms are trained on the Cityscapes streetscape dataset to obtain the respective models, and the traditional training strategies are used.

TABLE 3

Performance Comparison Of MCDWA_Net Algorithm And Advanced Algorithm On Cityscapes streetscape Dataset

| Algorithm name | MIoU (%) | computational complexity | Reaonsing speed (ms/frame) |
| --- | --- | --- | --- |
| MCDWA_Net algorithm | 80.4 | 22.4 | 16 |
| BiSeNet algorithm | 68.1 | 14.8 | 13 |
| BiSeNetV2 algorithm | 72.6 | 21.15 | 15 |
| DFANet algorithm | 71.9 | 3.4 | 10 |
| Deeplab V3 algorithm | 71.4 | 185.2 | 157 |
| ShuffleNetV2 algorithm | 70.3 | 65 | 64.9 |

Table 3 shows the comparison results of performance index of MCDWA_Net and five relatively latest semantic segmentation algorithms. It is obvious from Table 3 that the segmentation accuracy of the MCDWA_Net algorithm proposed in the present disclosure is higher than that of the other five algorithms, but the computational complexity of the MCDWA_Net algorithm is more complex than that of the BiSeNet, BiSeNetV2 and DFANet algorithms, so the reasoning speed of the MCDWA_Net algorithm is slightly slower than that of the BiSeNet, BiSeNetV2 and DFANet algorithms. MCDWA_Net is better than that of the Deeplab V3 and ShuffleNet V2 algorithms in terms of algorithm accuracy and reasoning speed.

Figure 13:
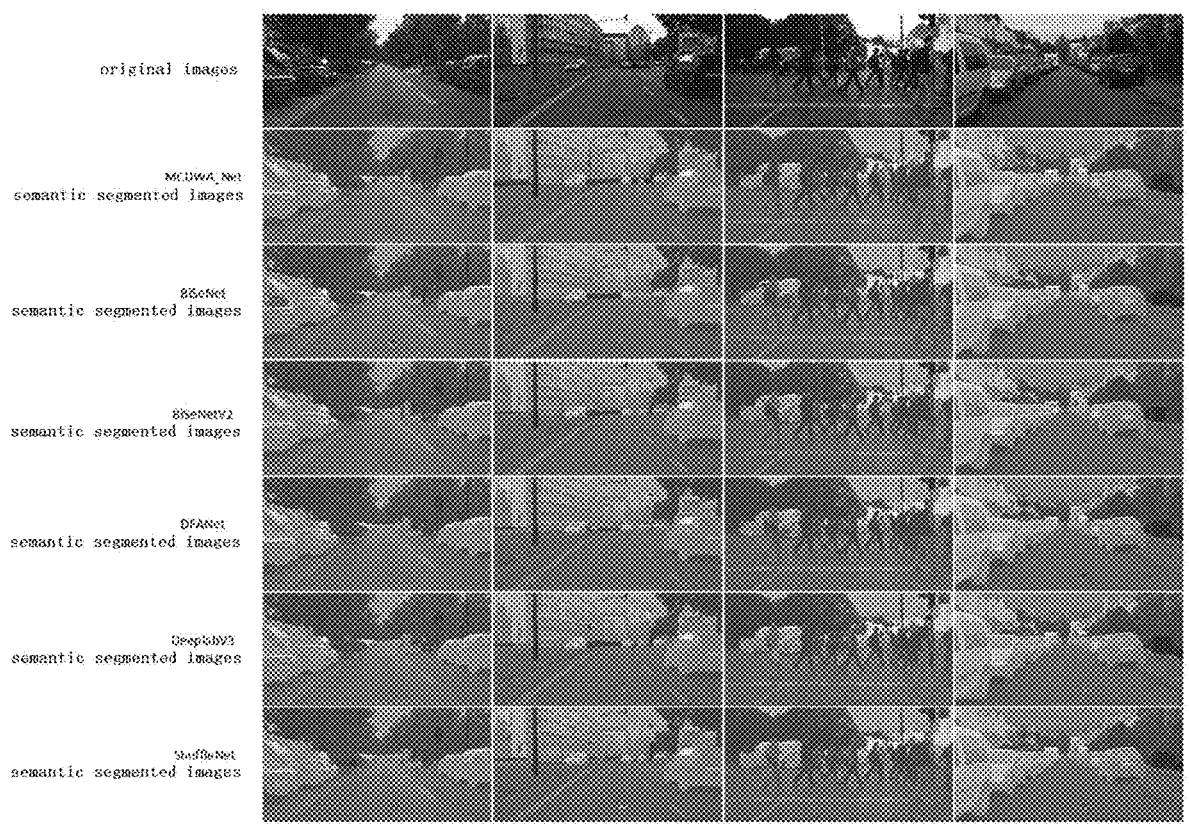
FIG. 13 is an actual segmentation effect diagram of the six semantic segmentation algorithms in example 1.

The specific segmentation effects of the above six algorithms are shown in FIG. 13. As can be seen from Table 3 and FIG. 13, although the algorithm in the present disclosure slightly reduces the reasoning speed, it greatly improves the segmentation accuracy, with a MIoU of up to 80.4% and a reasoning speed of 16 ms/frame. Therefore, the comprehensive performance is better, the performance-price ratio is higher, and has better practical application value.

EXAMPLE 2

In this example, an experiment of laboratory corridor scene dataset is mainly performed, and the laboratory corridor scene dataset is a dataset established by a self-set scene. An important object of this example is to verify the training effect of the enhanced training module designed according to the present disclosure. When the MCDWA Net model is trained with the laboratory corridor scene dataset, the training batch Batch_size is set to 4, the number of classes Num_classes is set to 8, the number of iterations Epoches is set to 500, the learning strategy adopts the random gradient descent (SGD) algorithm, and the its momentum is set to 0.9, the initial learning rate is set to 0.05, and the weight decay rate is set to be 0.0001.

Figure 14A:
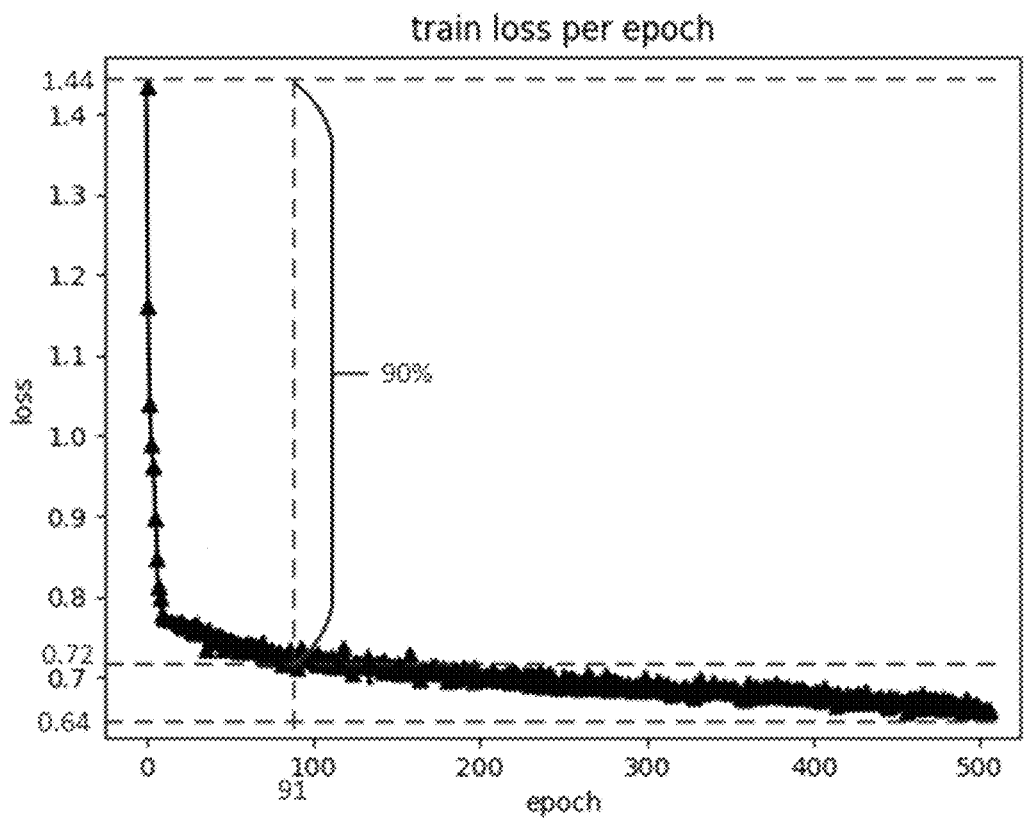
FIG. 14 is a graph showing the change of model train loss value in example 2.
Figure 14B:
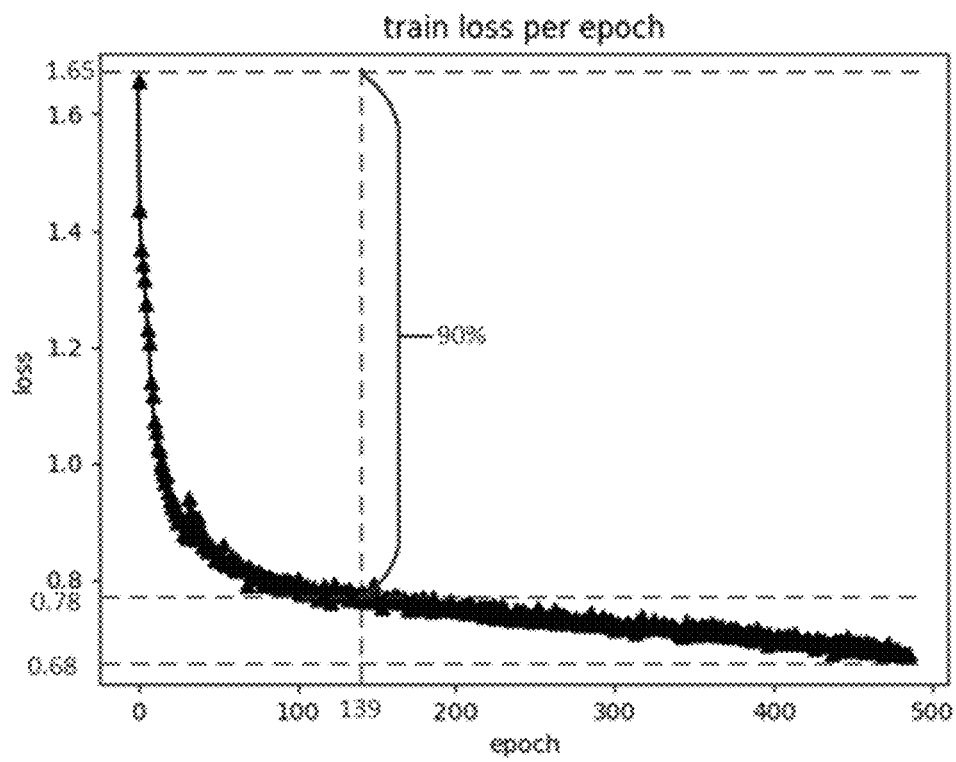
Figure 14C:
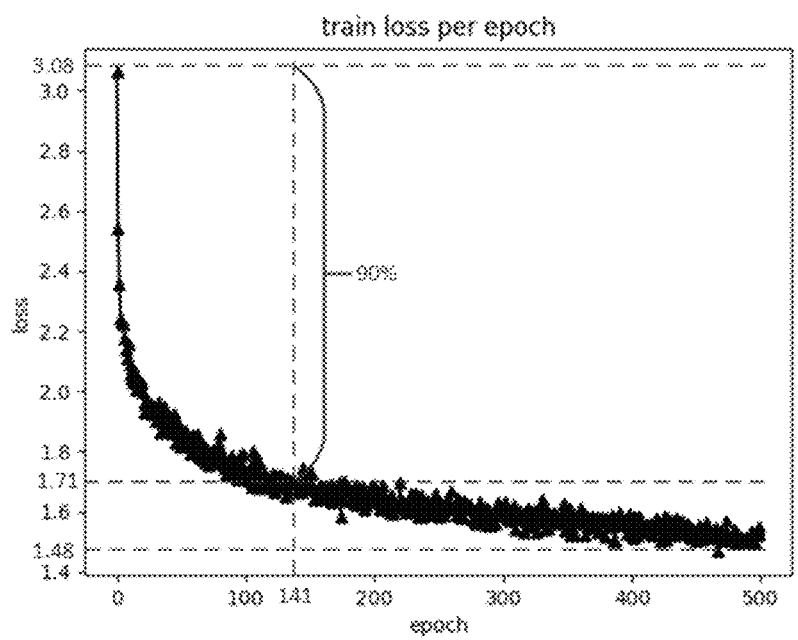
Figure 15A:
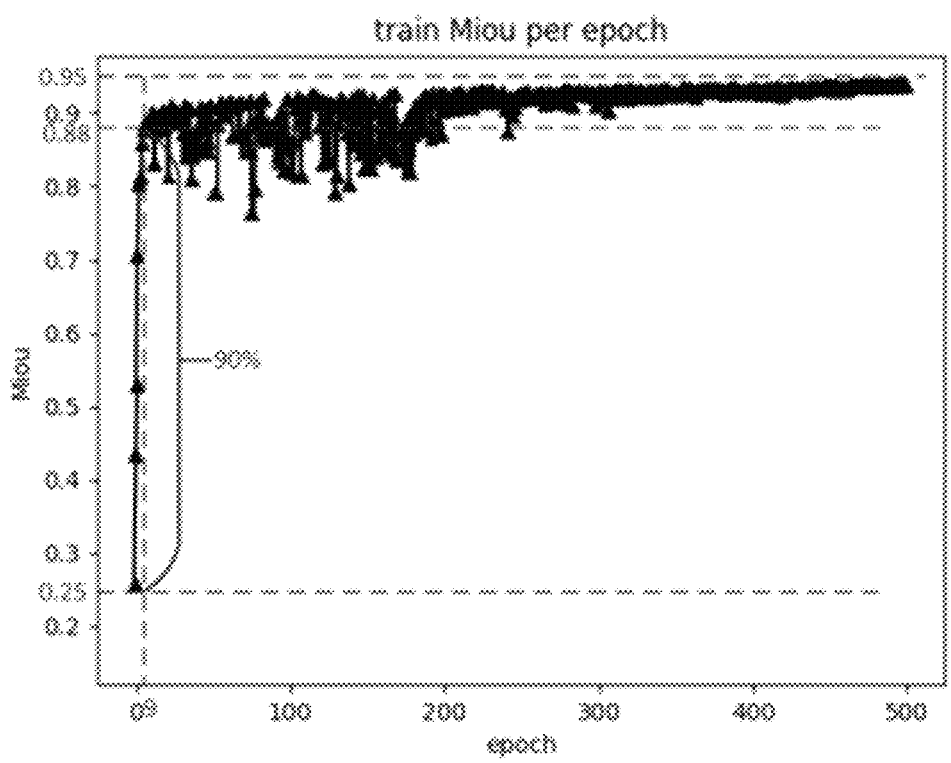
FIG. 15 is a graph showing the change of model train MIoU value in example 2.
Figure 15B:
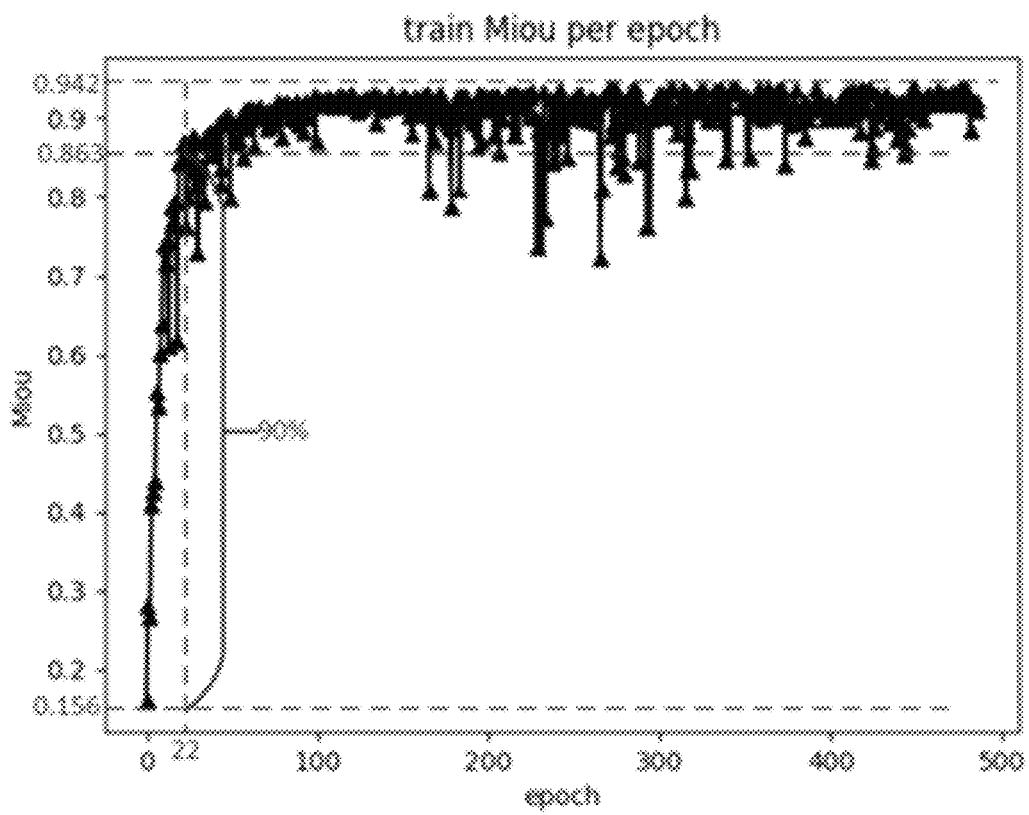
Figure 15C:
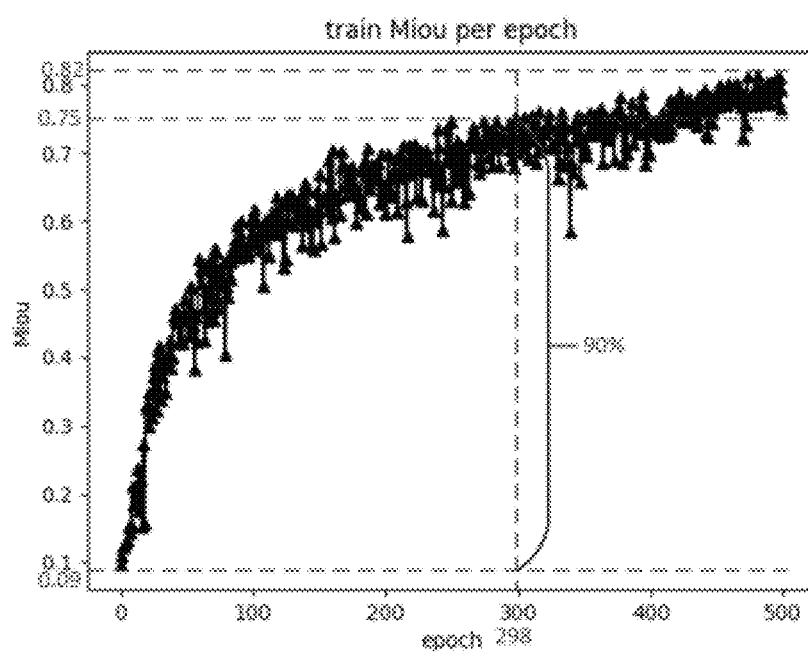

The superiority of the algorithm of the present disclosure is verified by comparing the training result of the CEDice Loss loss function of the enhanced training module proposed by the present disclosure with the training results of the Cross-Entropy loss function and the Dice Loss loss function respectively. The change in loss value during training is shown in FIG. 14, and the change in MIoU value is shown in FIG. 15. In addition, Table 4 shows the training effects of various loss functions.

TABLE 4

Comparison Of Training Effects Of Three Loss Functions

| Loss Function | Loss convergence 90% (times) | MIoU (%) |
| --- | --- | --- |
| CEDice loss Loss Function | 90 times | 95% |
| Cross-Entropy Loss Function | 139 times | 94.2% |
| Dice loss Loss Function | 141 times | 82% |

With reference to FIGS. 14 and Table 4, it can be seen that the CEDice Loss loss function designed according to the present disclosure can reduce the loss value by more than 90% by cycling 90 times during the training, the Cross-Entropy loss function can reduce the loss value by 90% by cycling 139 times during the training, and the Dice Loss loss function can reduce the loss value by 90% by cycling 141 times during the training. It can be seen that the loss function designed according to the present disclosure can better reduce the loss value during the training.

With reference to FIG. 15 and Table 4, it can be seen that during training with the laboratory corridor scene dataset, the enhanced training module of the present disclosure uses the CEDice Loss loss function, so it can make the MIoU of the model up to 95%, and the MIoU of the model can be increased by 90% by only cycling 90 times. The Cross-Entropy loss function and Dice Loss loss function can make the accuracy of the model up to 94.2% and 82.0%. They can increase the MIoU of the model by 90% by cycling 22 times and 298 times, respectively. Therefore, the training algorithm designed in the present disclosure can improve the semantic segmentation network model to higher accuracy faster than the application of other loss functions alone.

Figure 16:
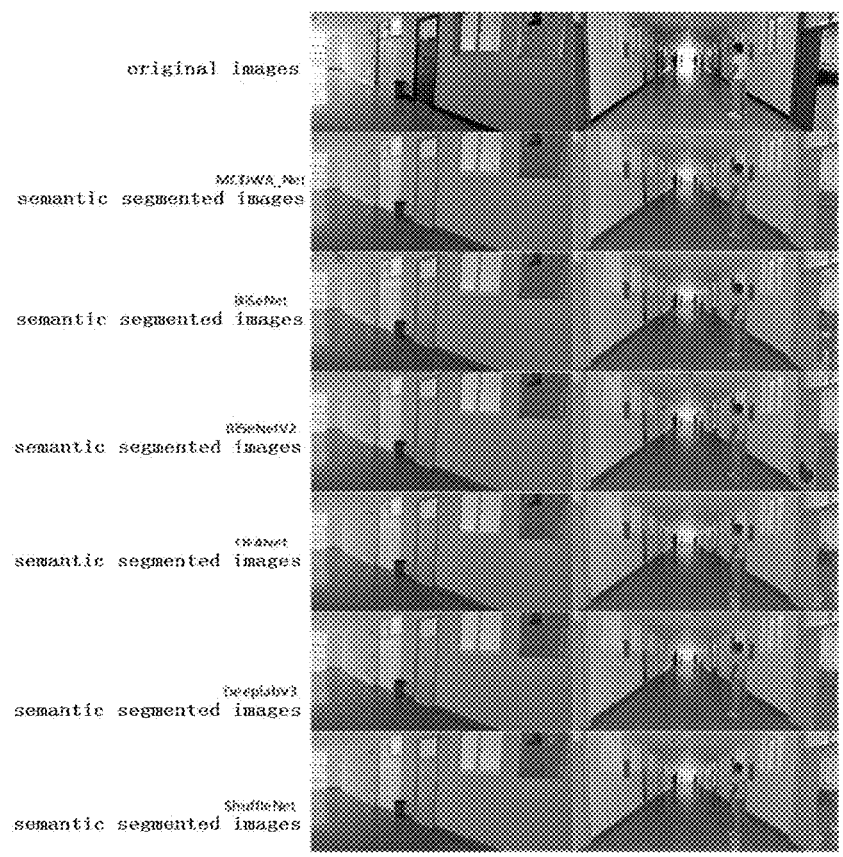
FIG. 16 is an effect diagram of six semantic segmentation algorithms in example 2.

Meanwhile, in the present disclosure, the BiSeNet, BiSeNetV2, DFANet, Deeplab V3 and ShuffleNet V2 algorithms are trained on the laboratory corridor scene dataset to obtain the respective models, and compared with the performance of the present disclosure. The performance of the six algorithms on the laboratory corridor scene dataset is shown in Table 5, and the segmentation effects on the laboratory corridor scene are shown in FIG. 16.

TABLE 5

Performance Comparison Of MCDWA_Net Algorithm And Advanced Algorithm On Laboratory Corridor Scene Dataset

| Algorithm name | MIoU (%) | computational complexity (G) | Reaonsing speed (ms/frame) |
|---|---|---|---|
| MCDWA_Net algorithm | 94.1 | 22.4 | 16 |
| BiSeNet algorithm | 79.9 | 14.8 | 13 |
| BiSeNetV2 algorithm | 82.3 | 21.15 | 15 |
| DFANet algorithm | 81.4 | 3.4 | 10 |
| Deeplab V3 algorithm | 87.6 | 185.2 | 167 |
| ShuffleNetV2 algorithm | 81.9 | 65 | 64.9 |

As shown in Table 5, although the reasoning speed of the MCDWA_Net algorithm proposed in the present disclosure is relatively slow, its segmentation accuracy is greatly improved. The specific segmentation effects of these algorithms are shown in FIG. 16. The algorithm proposed in the present disclosure is superior to other algorithms in image segmentation effect.

In addition, the algorithm proposed in the present disclosure has significantly improved segmentation accuracy which is much higher than that of the other five algorithms, and has relatively low computational complexity and relatively fast reasoning speed. According to FIG. 15 (the left image is a simple scene, and the right image is a complex scene), it can be seen that the advantages of the algorithm of the present disclosure are not very obvious in the simple scene of the left image, but in the complex scene of the right image, it can be obviously seen that the other five algorithms have defects in semantic segmentation of the scene. Because they cannot completely extract global semantic information of the image, the segmentation effect is relatively poor. Therefore, in the experiment of the laboratory corridor scene, the algorithm proposed in the present disclosure has better comprehensive performance, higher segmentation accuracy and faster operation speed, thus further demonstrating the superiority of the algorithm proposed in the present disclosure in the actual scene.

Finally, it should be noted that although this specification contains many specific implementation details, these should not be construed as limiting the scope of any disclosure or the scope of the claims, but rather as describing the features of specific embodiments of a particular disclosure. Certain features described in various embodiments within this specification may also be implemented in combination in a single embodiment. On the other hand, the various features described in a single embodiment may also be implemented separately in multiple embodiments or in any suitable sub-combination. Further, while features may function in certain combinations as described above and even be initially claimed, one or more features from the claimed combinations may in some cases be removed from the combination, and the claimed combinations may point to sub-combinations or variations of sub-combinations.

Similarly, while operations are depicted in a particular order in the accompanying drawings, this should not be understood as requiring those operations to be performed in the particular order or order shown, or requiring all of the illustrated operations to be performed to achieve the desired result. In some cases, multitasking and parallel processing may be advantageous. Further, the separation of the various system modules and components in the above-described embodiments should not be understood as requiring such separation in all embodiments, and it should be understood that the described program components and systems may typically be integrated together in a single software product or encapsulated into multiple software products.

Thus, specific embodiments of the subject matter have been described. Other embodiments are within the scope of the appended claims. In some cases, the actions described in the claims may be performed in a different order and still achieve the desired result. Further, the processes depicted in the drawings need not be shown in a particular order or sequential order to achieve a desired result. In some implementations, multi-task and parallel processing may be advantageous.

The foregoing description is merely a preferred embodiment of the present disclosure and is not intended to limit the present disclosure. Any modification, equivalent replacement, improvement and the like made within the spirit and principles of the present disclosure shall fall within the protection scope of the present disclosure.

The invention claimed is:

1. A computer-implemented method for performing image semantic segmentation in complex real-world environments based on multi-channel deep weighted aggregation, comprising:
   executing, by one or more processors, instructions stored on a non-transitory computer-readable storage medium, wherein the instructions cause the processor(s) to performing follow operations:
   S1, semantic features with definite class information in an image, transition semantic features between low-level semantic and high-level semantic, and semantic features of context logic relationship in the image are extracted by a low-level semantic channel, an auxiliary semantic channel and a high-level semantic channel, respectively;
   S2, three different semantic features obtained in S1 are fused by weighted aggregation to obtain global semantic information of the image;
   S3, the semantic features output from respective semantic channels in S1 and the global semantic information in S2 are used to compute loss function for training, wherein, in S1:
   a shallow convolution structure network is used to construct the low-level semantic channel for extracting low-level semantic information, a depthwise separable convolution structure network is used to construct an auxiliary semantic channel, and transition semantic information obtained from the auxiliary semantic channel is fed back to the high-level semantic channel;
   a deep convolution structure network is used to construct the high-level semantic channel for extracting high-level semantic information; and a process of extracting the low-level semantic information by the shallow convolution structure network includes:

$$LS(I_{H*W})=S3(S2(I_{H*W})));$$

wherein, $LS(I_{H*W})$ is a extraction process of the low-level semantic information, $I_{H*W}$ is input image array, and S is a convolution stride.

2. The computer-implemented method for performing image semantic segmentation in complex real-world environments based on multi-channel deep weighted aggregation according to claim 1, wherein, the separable convolution structure network includes three auxiliary modules connected in series and an attention mechanism module located at the end, each module transfers the extracted auxiliary semantic information of different levels to the high-level semantic channel;

a process of extracting the transition semantic information by the auxiliary semantic channel includes:

$$AS(K_{m*n})=Atten(Aux(Aux(Aux(K_{m*n}))))$$

wherein, $AS(x)$ is the extraction process of the transition semantic information, $K_{m*n}$ is a feature array input to the auxiliary semantic channel, $Aux(x)$ is the auxiliary module, and $Atten(x)$ is the attention mechanism module;

the auxiliary semantic information output at each stage of the auxiliary semantic channel includes:

$$Aux_1(K_{m*n})=Aux(K_{m*n})$$

$$Aux_2(K_{m*n})=Aux(Aux_1(K_{m*n}))$$

$$Aux_3(K_{m*n})=Aux(Aux_2(K_{m*n}))$$

$$Aux_1'(K_{m*n})=Up(AS(K_{m*n}),4)$$

where $Up(x,k)$ is upsampling of the attention mechanism module to the high-level semantic channel, x is input, k is upsampling multiple, and its selected value is 4.

3. The computer-implemented method for performing image semantic segmentation in complex real-world environments based on multi-channel deep weighted aggregation according to claim 2, wherein, the high-level semantic channel includes a start module, feature aggregation module, and a semantic embedding module, and a process of extracting the high-level semantic information includes:

it fuses with the auxiliary semantic information provided by the auxiliary semantic channel by the start module and the feature aggregation module to extract deep semantic information of the image, and then the semantic embedding module integrates the auxiliary semantic channel with the deep semantic information of the high-level semantic channel so as to obtain the high-level semantic information.

4. The computer-implemented method for performing image semantic segmentation in complex real-world environments based on multi-channel deep weighted aggregation according to claim 3, wherein, the start module comprises two different down-sampling methods, convolution and maximum pooling, and two output results are connected and output after convolution; the feature aggregation module comprises two feature aggregation sub-modules, deep convolution is used to deepen the number of feature layers, the aggregation process of the feature aggregation module comprises:

$$FGB(K_{m*n}', s_1, s_1') = FG(FG(K_{m*n}', s_1), s_1')$$

wherein, $FGB(x)$ is reasoning process of the feature aggregation module, $FG(x,s_1)$ is reasoning process of the feature aggregation sub-module, $$K_{m*n}'$$

is input feature array, stride $s_1=2$, $$s_1'=1;$$

the reasoning processes of the feature aggregation modules of the three auxiliary modules in the auxiliary semantic channel include:

$$FGB1(K_{m*n}) = FGB(ST(K_{m*n}) + Aux_1(K_{m*n}) + Aux_1'(K_{m*n}), s_1, s_1')$$

$$FGB2(K_{m*n}) = FGB(FGB1(K_{m*n}) + Aux_2(K_{m*n}), s_1, s_1')$$

$$FGB3(K_{m*n}) = FGB(FGB2(K_{m*n}) + Aux_3(K_{m*n}), s_1, s_1')$$

the semantic embedding module uses global average pooling and jump connection structure to deeply fuse the high-level semantic channel and the auxiliary semantic information provided by the auxiliary semantic channel;

the semantic information extraction process of the high-level semantic channel includes:

$$AS(K_{m*n})=SEB(FGB3(K_{m*n}))$$

wherein, $AS(x)$ is the semantic information extraction process of the high-level semantic channel, $SEB(x)$ is the reasoning process of the semantic embedding module.

5. The computer-implemented method for performing image semantic segmentation in complex real-world environments based on multi-channel deep weighted aggregation according to claim 1, wherein, the fusion of semantic features in S2 includes weighted aggregation and fusion of three semantic features, the weighted aggregation includes: updating the low-level semantic channel, the auxiliary semantic channel, and the high-level semantic channel to obtain weighted weights of the semantic features $\varepsilon_1$, $\varepsilon_2$ and $\varepsilon_3$ respectively, and the updating of the weight is determined adaptively by the $MIoU=\{MIoU_1, MIoU_2, MIoU_3\}$ measured by the three semantic features in a verification set, the MIoU is obtained on the verification set by using the network weights of the respective channels, and then the weighted weights of the three semantic features are updated by the MIoU values according to the following formulas:

$$\varepsilon_1 = \begin{cases} 1 + MIoU, & MIoU_1 = \max\{MIoU\} \\ 1, & \min\{MIoU\} < MIoU_1 < \max\{MIoU\} \\ 1 - MIoU, & MIoU_1 = \min\{MIoU\} \end{cases}$$

$$\varepsilon_2 = \begin{cases} 1 + MIoU, & MIoU_2 = \max\{MIoU\} \\ 1, & \min\{MIoU\} < MIoU_2 < \max\{MIoU\} \\ 1 - MIoU, & MIoU_2 = \min\{MIoU\} \end{cases}$$

$$\varepsilon_3 = \begin{cases} 1 + MIoU, & MIoU_3 = \max\{MIoU\} \\ 1, & \min\{MIoU\} < MIoU_3 < \max\{MIoU\} \\ 1 - MIoU, & MIoU_3 = \min\{MIoU\} \end{cases}$$

weighting processes of three semantic features include:

$$\begin{cases} \phi_1(x) = \varepsilon_1 * Conv(x) \\ \phi_2(x) = \varepsilon_2 * sigmoid(x) \\ \phi_3(x) = \varepsilon_3 * \text{Up}(x) \end{cases}$$

wherein, Up is an upsampling with a magnification of 2, Up(x) represents the upsampling, Conv is convolution operation, the calculation of sigmoid (x) includes:

$$sigmoid(x) = \frac{1}{1+e^x}.$$

6. The computer-implemented method for performing image semantic segmentation in complex real-world environments based on multi-channel deep weighted aggregation according to claim 3, wherein, the fusion of the three semantic features includes multiplying the weighted results obtained by the pairwise semantic channels and then performing 3*3 convolution with a stride of 1, the pairwise aggregation processes of three semantic features comprise:

$$\begin{cases} SA_1(x) = Conv_1(\phi_1(x) * \phi_3(x)) \\ SA_2(x) = Conv_1(\phi_1(x) * \phi_2(x)) \\ SA_3(x) = Conv_1(\phi_2(x) * \phi_3(x)) \end{cases}$$

wherein, SA1(x), SA2(x) and SA3 (x) are the pairwise aggregation processes of three semantic features;
a composite process of the three semantic features obtained from the three semantic channels comprises:

MSA(x)=SA$_1$(x)+SA$_2$(x)+SA$_3$(x)

wherein, MSA (x) is the composite process of the three semantic features.

7. The computer-implemented method for performing image semantic segmentation in complex real-world environments based on multi-channel deep weighted aggregation according to claim 1, wherein, in S3, the semantic features output from respective channels are upsampled, the upsampled results and the global semantic information of the image are used together to calculate loss for random gradient descent learning, the loss function includes calculation of weight, calculation of the loss function, and determination of the loss function in a comprehensive training mechanism, wherein the calculation of the weight includes:

$$\alpha = \frac{(n+1)-2}{(n+1)+2} = \frac{n-1}{n+3}$$

wherein, α is the weight, n is the number of classes; calculation of the loss function comprises:

CED(x,y)=CEL(x,y)+α*DL(x,y)

wherein, x is prediction data, y is real data, CEL(x, y) is Cross-Entropy loss function and DL(x, y) is Dice Loss loss function;
the determination of loss function in comprehensive training mechanism includes:

$$Loss(P_{re}, A_1, A_2, A_3, T) = CED(P_{re}, T) + \sum_{i=1}^{3} CED(A_i, T)$$

wherein, T is a real label, Pre is output label of the global semantic information, and $A_1$, $A_2$ and $A_3$ are the output labels of the low-level semantic channel, the auxiliary semantic channel and the high-level semantic channel, respectively.

* * * * *